US008291018B2

(12) United States Patent
Petersen et al.

(10) Patent No.: US 8,291,018 B2
(45) Date of Patent: Oct. 16, 2012

(54) METHODS, APPARATUSES, AND COMPUTER PROGRAM PRODUCTS FOR PROVIDING ACTIVITY COORDINATION SERVICES

(75) Inventors: Felix Petersen, Berlin (DE); Stefan Kellner, Berlin (DE); Klaus Hartl, Berlin (DE); Andreas Follmann, Berlin (DE); Katharina Birkenback, Berlin (DE); Jeanny Wang, Berlin (DE)

(73) Assignee: Nokia Corporation, Espoo (FI)

( * ) Notice: Subject to any disclaimer, the term of this patent is extended or adjusted under 35 U.S.C. 154(b) by 147 days.

(21) Appl. No.: 12/241,596

(22) Filed: Sep. 30, 2008

(65) Prior Publication Data

US 2010/0082735 A1    Apr. 1, 2010

(51) Int. Cl.
*G06F 15/16* (2006.01)

(52) U.S. Cl. ........ 709/205; 709/204; 709/206; 709/207; 455/422.1; 455/456.1; 455/456.3; 705/7; 705/14

(58) Field of Classification Search .......... 709/204–207; 455/422.1, 456.1–456.3; 705/7, 14
See application file for complete search history.

(56) References Cited

U.S. PATENT DOCUMENTS

| | | | |
|---|---|---|---|
| 7,225,187 B2 * | 5/2007 | Dumais et al. .................. 1/1 |
| 2002/0078033 A1 * | 6/2002 | Scaturro et al. .................. 707/3 |
| 2002/0194246 A1 | 12/2002 | Moskowitz et al. | |
| 2002/0196280 A1 * | 12/2002 | Bassett et al. ................ 345/751 |
| 2003/0045301 A1 * | 3/2003 | Wollrab ........................ 455/456 |
| 2003/0158855 A1 | 8/2003 | Farnham et al. | |
| 2004/0017376 A1 | 1/2004 | Tagliabue et al. | |
| 2004/0054931 A1 * | 3/2004 | Himmel et al. ................ 713/202 |
| 2004/0267730 A1 * | 12/2004 | Dumais et al. .................. 707/3 |
| 2005/0203757 A1 * | 9/2005 | Lei et al. .......................... 705/1 |
| 2005/0257176 A1 * | 11/2005 | Lu .................................. 715/963 |
| 2006/0068812 A1 * | 3/2006 | Carro et al. ................ 455/456.3 |
| 2006/0069686 A1 | 3/2006 | Beyda et al. | |
| 2006/0148528 A1 | 7/2006 | Jung et al. | |
| 2006/0217112 A1 * | 9/2006 | Mo ........................... 455/422.1 |
| 2007/0011367 A1 * | 1/2007 | Scott et al. ..................... 710/48 |
| 2007/0150444 A1 | 6/2007 | Chesnais et al. | |
| 2007/0186193 A1 * | 8/2007 | Curran ......................... 715/968 |
| 2007/0198505 A1 * | 8/2007 | Fuller ............................. 707/5 |
| 2007/0255807 A1 * | 11/2007 | Hayashi et al. ............... 709/219 |
| 2007/0255831 A1 | 11/2007 | Hayashi et al. | |
| 2007/0294304 A1 * | 12/2007 | Bassett et al. ............. 707/104.1 |

(Continued)

OTHER PUBLICATIONS

Greg Linden, et al.; "Amazon.com Recommendations—Item-to-Item Collaborative Filtering;" Industry Report, IEEE Internet Computing; Jan./Feb. 2003.

(Continued)

*Primary Examiner* — Wing Chan
*Assistant Examiner* — Razu Miah
(74) *Attorney, Agent, or Firm* — Alston & Bird LLP

(57) ABSTRACT

A method, apparatus, and computer program product are provided, which may provide activity coordination services. An apparatus may include a processor configured to receive a request for a context-sensitive calendar. The request may comprise an indication of an associated context. The processor may also be configured to determine the context associated with the received request. The processor may further be configured to aggregate one or more information atoms based at least in part upon the determined context. The processor may additionally be configured to generate a context-sensitive calendar comprising the aggregated information atoms. The processor may also be configured to provide the generated context-sensitive calendar to a user. Corresponding methods and computer program products are also provided.

30 Claims, 6 Drawing Sheets

U.S. PATENT DOCUMENTS

| | | | |
|---|---|---|---|
| 2008/0114749 A1 | 5/2008 | Chandhok et al. | |
| 2008/0115196 A1* | 5/2008 | Michel et al. | 726/4 |
| 2008/0161020 A1* | 7/2008 | Malon | 455/456.6 |
| 2008/0177797 A1* | 7/2008 | Eldering et al. | 707/200 |
| 2008/0275865 A1* | 11/2008 | Kretz et al. | 707/5 |
| 2008/0301144 A1* | 12/2008 | Boss et al. | 707/10 |
| 2009/0125410 A1* | 5/2009 | Perlman | 705/26 |
| 2009/0132378 A1* | 5/2009 | Othmer et al. | 705/14 |
| 2009/0158173 A1* | 6/2009 | Palahnuk et al. | 715/753 |
| 2009/0170532 A1* | 7/2009 | Lee et al. | 455/456.3 |
| 2009/0298511 A1* | 12/2009 | Paulson | 455/456.1 |
| 2010/0082376 A1* | 4/2010 | Levitt | 705/7 |

OTHER PUBLICATIONS

Currently DOPPLR, http://www.dopplr.com, 2007-2008 Dopplr.
International Search Report for PCT/FI2009/050677 mailed Jan. 11, 2010.

* cited by examiner

METHODS, APPARATUSES, AND COMPUTER PROGRAM PRODUCTS FOR PROVIDING ACTIVITY COORDINATION SERVICES

TECHNOLOGICAL FIELD

Embodiments of the present invention relate generally to mobile communication technology and, more particularly, relate to methods, apparatuses, and computer program products for providing activity coordination services.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies as well as evolved computing devices making use of networking technologies continue to facilitate ease of information transfer and convenience to users. One area in which there is a demand to further improve the convenience to users is harnessing the connectivity and ready access to information available through expansion of networking technologies for the provision of activity coordination services.

For example, modern computing technologies may facilitate management of, access to, and communication with a user's contacts. Additionally, existing networking and computing technologies may facilitate scheduling and viewing of activities, such as in a calendar application, by computing device users. Computing devices may also be configured to determine a current location of a user, such as through Global Positioning System (GPS) technology. Social networking services, such as Facebook™, MySpace™, and LinkedIn™, may facilitate interaction between a user and contacts. However, users currently lack a system for harnessing available information and integrating various services so as to provide users with a meaningful system for planning, creating, coordinating, and sharing activities with contacts.

Accordingly, it may be advantageous to provide computing device users with methods, apparatuses, and computer program products for providing activity coordination services.

BRIEF SUMMARY OF SOME EXAMPLES OF THE INVENTION

A method, apparatus, and computer program product are therefore provided, which may provide activity coordination services. In particular, a method, apparatus, and computer program product may be provided to enable, for example, the generation of and access to context-sensitive calendars. In this regard, context-sensitive calendars may provide for calendars that are dynamically built based at least in part upon a context in which a user is using an activity-based service. Users may subscribe to particular context-sensitive calendars such that the user may periodically receive updated context-sensitive calendars comprising information based upon the user's subscription preferences. Such context-sensitive calendars may provide a much richer solution in comparison to standard events calendars, which merely add events onto a local calendar and may only provide one discrete dimension of information, e.g., what is happening and when. In contrast to standard events calendars, context-sensitive calendars may be dynamically generated so as to provide multi-dimensional views of user activity data so as to facilitate coordination and planning of activities.

In one exemplary embodiment, a method is provided which may include receiving a request for a context-sensitive calendar. The request may comprise an indication of an associated context. The method may further include determining the context associated with the received request. The method may also include aggregating one or more information atoms based at least in part upon the determined context. The method may further include generating a context-sensitive calendar comprising the aggregated information atoms. The method may additionally include providing the generated context-sensitive calendar to a user.

In another exemplary embodiment, a computer program product is provided. The computer program product includes at least one computer-readable storage medium having computer-readable program instructions stored therein. The computer-readable program instructions may include first, second, third, fourth, and fifth program instructions. The first program instruction is for receiving a request for a context-sensitive calendar. The request may comprise an indication of an associated context. The second program instruction is for determining the context associated with the received request. The third program instruction is for aggregating one or more information atoms based at least in part upon the determined context. The fourth program instruction is for generating a context-sensitive calendar comprising the aggregated information atoms. The fifth program instruction is for providing the generated context-sensitive calendar to a user.

In another exemplary embodiment, an apparatus is provided, which may include a processor configured to receive a request for a context-sensitive calendar. The request may comprise an indication of an associated context. The processor may also be configured to determine the context associated with the received request. The processor may further be configured to aggregate one or more information atoms based at least in part upon the determined context. The processor may additionally be configured to generate a context-sensitive calendar comprising the aggregated information atoms. The processor may also be configured to provide the generated context-sensitive calendar to a user.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

FIG. 5 illustrates a series of screenshots of an interface for a cascading date range selector according to an exemplary embodiment of the present invention.

DETAILED DESCRIPTION

Figure 1:
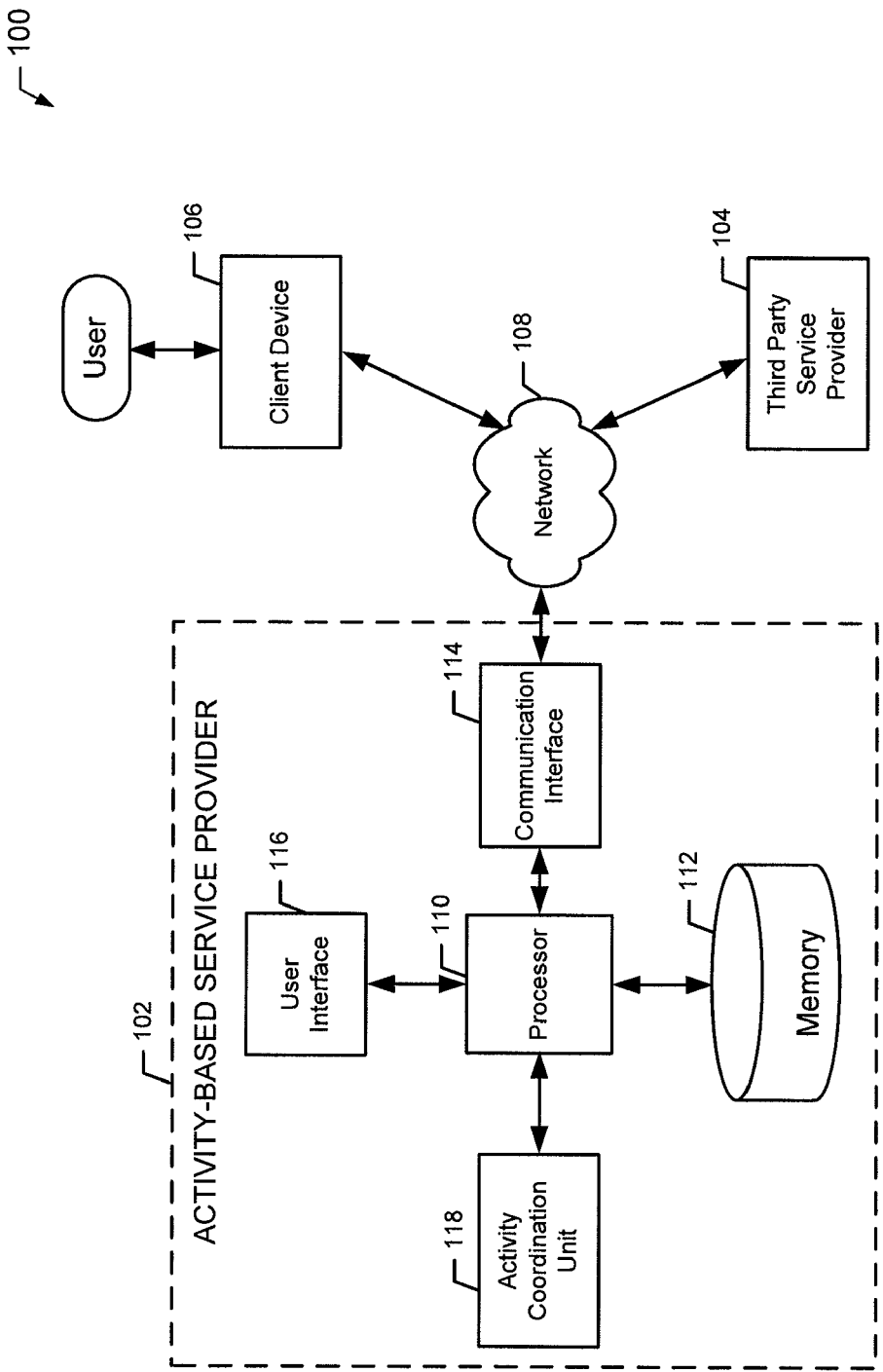
FIG. 1 illustrates a block diagram of a system for providing activity coordination services according to an exemplary embodiment of the present invention.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a system 100 for providing activity coordination services according to an exemplary embodiment of the present invention. As used herein, "exemplary" merely means an example and as such represents one example embodiment for the invention and should not be construed to narrow the scope or spirit of the invention in any way. It will be appreciated that the scope of the invention encompasses many potential embodiments in addition to those illustrated and described herein. As such, while FIG. 1 illustrates one example of a configuration of a system for providing activity coordination services, numerous other configurations may also be used to implement embodiments of the present invention.

As used herein, "activity" refers to a description of any event in which a user may participate. Such an activity may be, for example, a social event, sporting event, performing arts event, business meeting, personal appointment, and/or the like. In an exemplary embodiment, an activity may comprise one or more users participating in the activity, a place (e.g., location) at which the activity will occur, a time at which the activity will occur, an activity type (e.g., a social event, sporting event, performing arts event, business meeting, personal appointment, and/or the like), and/or the like. It will be appreciated that the place may comprise a real world location, a virtual world location, or some combination thereof. In an exemplary embodiment, an activity may be represented digitally as a shareable object that may be spread to contacts so as to inform them of an activity. In this regard, the activity may have a fixed uniform resource locator address associated with it such that users may reference the activity as an address that may be provided to contacts, such as via a message.

As used herein, a "contact" refers to a person with which a user may interact using an activity-based service provider and may be another user of an activity-based service provided by the activity-based service provider. In this regard, a user may invite a contact to participate in an activity. It will be appreciated that a "contact" as used herein need not be previously known to a user and may, but need not be stored in an address book or friend list of a user of an activity-based service provider.

As used herein, "information atom" refers to activities, places, and/or contacts having associated information that may provide contextual meaning to the activities, places, and/or contacts. This associated information may include, for example, location information (e.g., defining a location at which an activity will occur, a location at which a place is located, a location at which a contact has been/is/will be located, and/or the like), time information (e.g., defining a time at which an activity will occur, and/or the like), participant information (e.g., contacts participating in an activity, contacts located at a place, and/or the like), and/or the like. Information atoms may be stored in memory such that stored activities, places, and/or contacts are stored as information atoms in conjunction with associated information. Additionally or alternatively, information atoms may be generated on the fly, such as in response to a user query. In this regard, information about activities, places, and/or contacts may be retrieved and/or generated separately from the activities, places, and/or contacts and then may be associated with the activities, places, and/or contacts to form information atoms prior to providing the information atoms to the user.

As used herein, a "context-sensitive calendar" refers to an aggregation of activities, places, and/or contacts along with any other contextual information, wherein the activities, places, and/or contacts are dynamically aggregated depending on a context. In this regard, a context-sensitive calendar may be created as will be described further herein in response to a request for information depending on the circumstances of a request. It will be appreciated that a context-sensitive calendar need not be aggregated and/or displayed into any specific form and may be presented, for example, as a list, a table, grid, spreadsheet, and/or the like.

Referring now to FIG. 1, the system 100 may include an activity-based service provider 102, third party service provider 104, and client device 106 configured to communicate over a network 108. The activity-based service provider 102 may be embodied as any computing device or plurality of computing devices configured to provide activity-based services, such as those provided by Plazes.com, which will be described herein below, to users of remote devices, such as a client device 106, over the network 108. In an exemplary embodiment, the activity-based service provider 102 may be embodied as a server or plurality of servers, such as may comprise a server cluster or rack of blade servers. The third party service provider 104 may likewise be embodied as any computing device or plurality of computing devices and in an exemplary embodiment may be embodied as a server or plurality of servers. The third party service provider may be configured to provide any type of service (e.g., a navigation service, social networking service, multimedia service, internet search service, blog service, newsreader service, etc.) to users of remote computing devices, such as, for example users of a client device 106. The activity-based service provider 102 and third party service provider 104 may be further configured to communicate with each other so as to share service information in order to provide more robust and cohesive services to users. The client device 106 may be embodied as any computing device configured to communicate with an activity-based service provider 102 over the network 108 so as to create, manage and access activities. In some embodiments, the client device 106 may be embodied as a mobile computing device, such as, for example a mobile terminal 10 depicted in FIG. 2.

Figure 2:
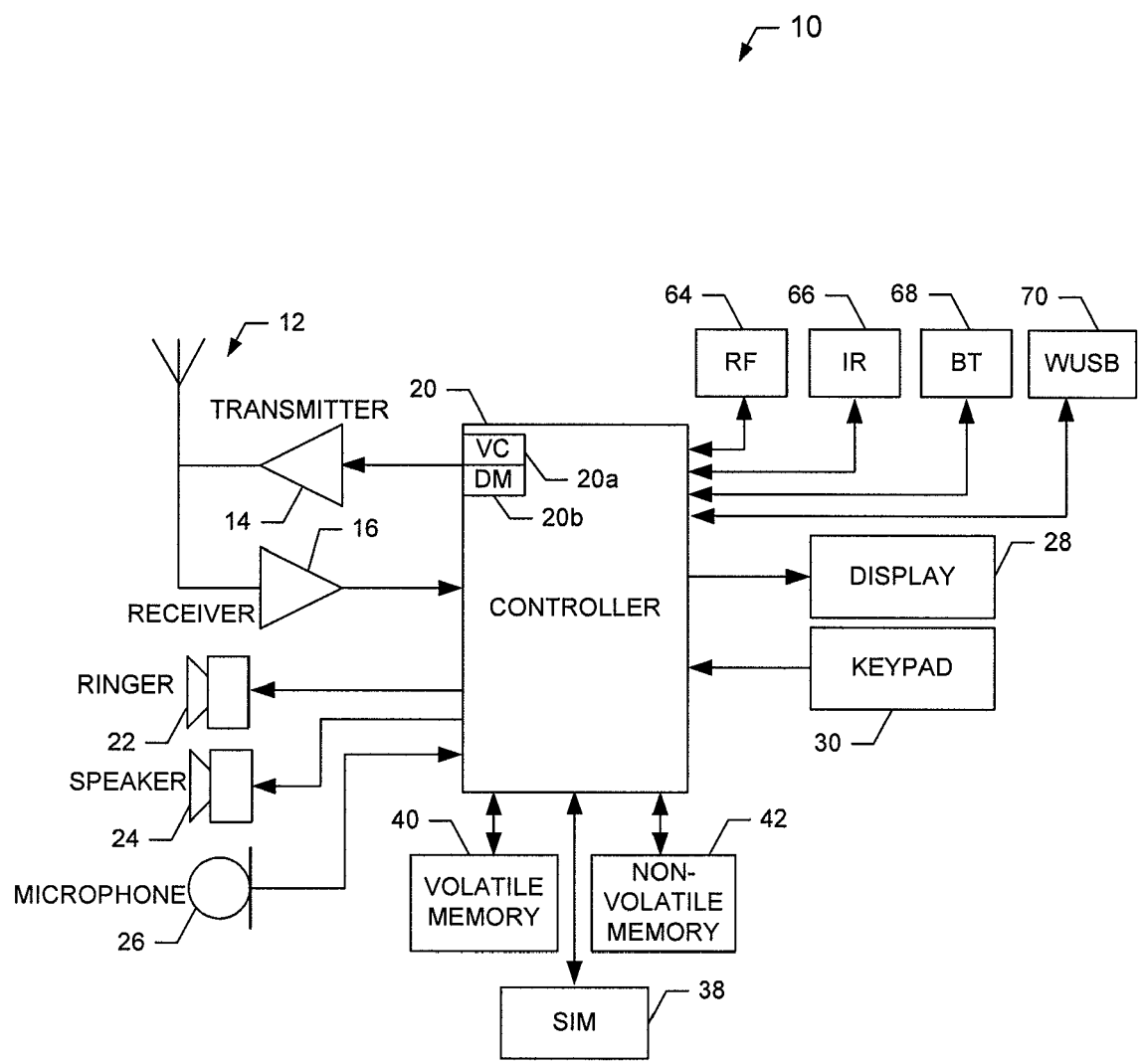
FIG. 2 is a schematic block diagram of a mobile terminal according to an exemplary embodiment of the present invention.

In this regard, FIG. 2 illustrates a block diagram of a mobile terminal 10 representative of one embodiment of a client device 106 in accordance with embodiments of the present invention. It should be understood, however, that the mobile terminal illustrated and hereinafter described is merely illustrative of one type of client device 106 that may benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal may also include a controller 20 or other processor(s) that provides signals to and receives signals from the transmitter and receiver, respectively. These signals may include signaling information in accordance with an air interface standard of an applicable cellular system, and/or any number of different wireless networking techniques, comprising but not limited to Wireless-Fidelity (Wi-Fi), wireless local access network (WLAN) techniques such as Institute of Electrical and Electronics Engineers (IEEE) 802.11, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) protocols.

It is understood that the controller 20 may comprise circuitry for implementing audio/video and logic functions of the mobile terminal 10. For example, the controller 20 may comprise a digital signal processor device, a microprocessor device, an analog-to-digital converter, a digital-to-analog converter, and/or the like. Control and signal processing functions of the mobile terminal may be allocated between these devices according to their respective capabilities. The controller may additionally comprise an internal voice coder (VC) 20a, an internal data modem (DM) 20b, and/or the like. Further, the controller may comprise functionality to operate one or more software programs, which may be stored in memory. For example, the controller 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the controller 20. As used herein, "operationally coupled" may include any number or combination of intervening elements (including no intervening elements) such that operationally coupled connections may be direct or indirect and in some instances may merely encompass a functional relationship between components. Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth transceiver 68 may be capable of operating according to ultra-low power Bluetooth technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, the client device 106 is not limited to being embodied as a mobile terminal 10 and may be embodied as any computing device, mobile or fixed, and accordingly may be embodied as a server, desktop computer, laptop computer, mobile terminal 10, and/or the like. The network 108 may comprise one or more wireless networks, wireline networks, cellular networks, or combination thereof. In an exemplary embodiment, the network 108 may be embodied as or comprise the internet. It will be appreciated that while FIG. 1 illustrates only a single third party service provider 104 and a single client device 106, the system 100 may comprise multiple third party service providers 104 and/or multiple client devices 106.

Figure 3:
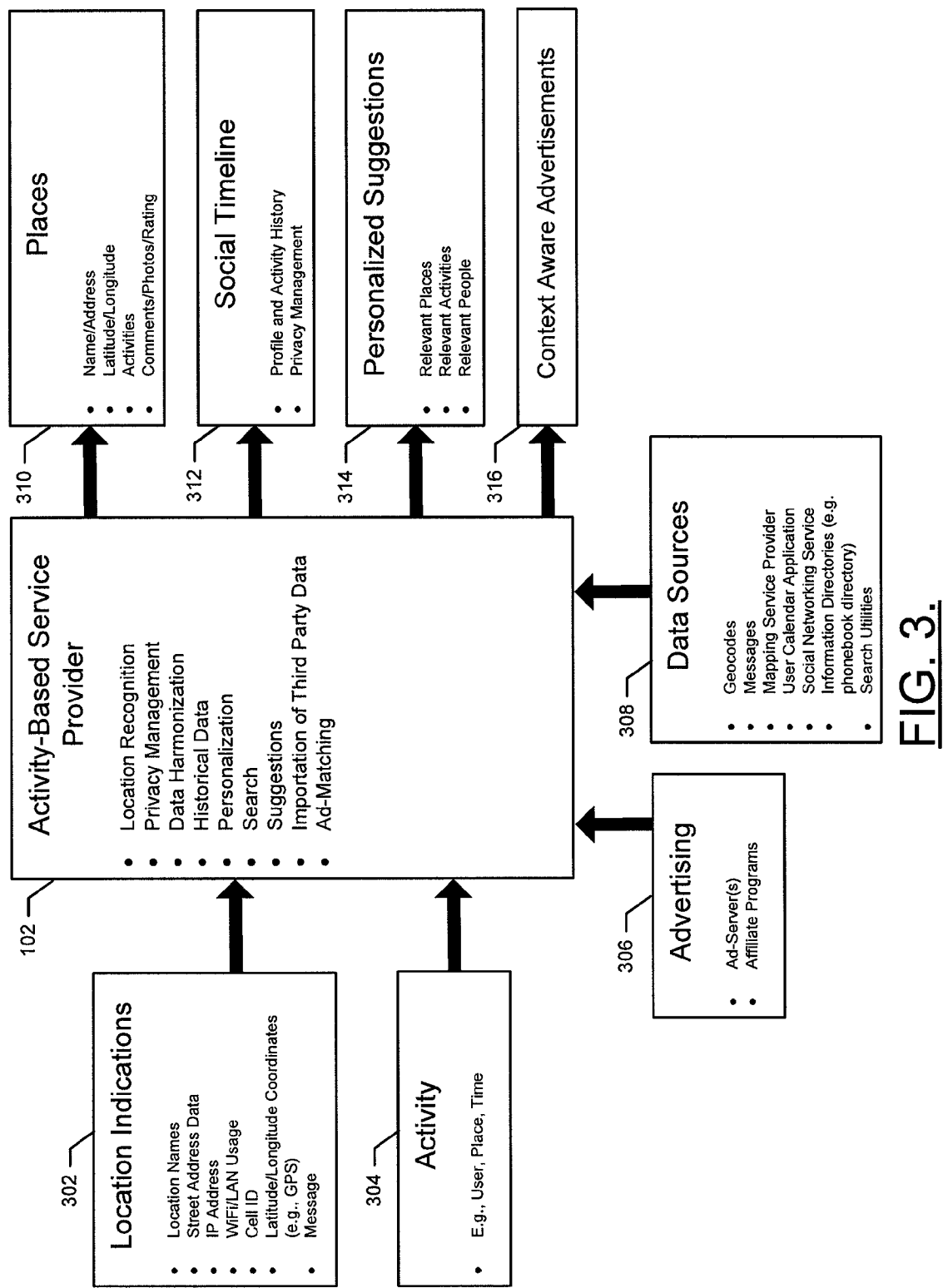
FIG. 3 is an information flow and processing diagram of information that may be received, processed, and sent by an activity-based service provider according to an exemplary embodiment of the present invention.

FIG. 3 illustrates a generalized information flow and processing diagram of data and information that may be received, processed, and sent by an activity-based service provider 102 according to an exemplary embodiment of the present invention. It will be appreciated, however, that FIG. 3 is merely for purposes of example and an activity-based service provider 102 may be configured to provide additional services as well as receive, process, and/or send information beyond that shown in FIG. 3. In this regard, an activity-based service provider 102 may be configured to receive various data, such as from a client device 106, third party service provider 104, and/or other device over the network 108. For example, the activity-based service provider 102 may be configured to receive one or more indications of a location of an activity. The location indications (box 302 of FIG. 3) may comprise an indication of a user's current location, such as may be determined from a current position of a client device 106 or may be an indication of a location at which a user will be in the future. Potential location indications may include a location name (e.g., Bob's house, Dave's office, and/or the like), street address data, an internet protocol address that may be correlated to a real world physical address or to a virtual world address, wireless access point usage (e.g. a local access network or the like) that may be correlated to a real world physical address or to a virtual world address, cell identification data identifying a cell from which a user's client device 106 is currently accessing a network, latitude and longitude coordinates such as may be determined by a global positioning system that may be embodied on a client device 106, a message (e.g. a short message service (SMS) message, multimedia messaging service (MMS) message, instant message (IM), e-mail, and/or the like) that may include a natural language indication of a location, and/or the like. Accordingly, the activity-based service provider 102 may be configured to recognize a location from the received location indication(s) and may be configured to associate the location with an activity.

The activity-based service provider 102 may further be configured to receive an activity (box 304 of FIG. 3), which may include associated information regarding time, place or location, user creating or hosting the activity, an activity type, any contacts participating or invited to the activity, and/or the like. The activity may be received, for example, from a client device 106, third party service provider 104, and/or other device over the network 108. A user of the client device 106 may enter the activity information via a user interface of the client device 106 and send the activity to the activity-based service provider. It will be appreciated that the activity-based service provider 102 may be configured to facilitate user entry and transmission of activity information over any number of interfaces, including, for example, a web page that may be loaded in a web browser, a dedicated application, and/or the like. Additionally or alternatively, the activity-based service provider 102 may be configured to receive activity data from a schedule management application, such as, for example, a calendar application, and/or from a third party service provider 104. The activity-based service provider may further be configured to provide sensory creation of activities. In this regard, the activity-based service provider may, for example, determine a user's location from one or more of the location indications above and create an activity associated with the user and the determined location. Sensory creation of activities may further comprise utilizing any data that may be received from a data source.

The activity-based service provider 102 may further be configured to receive data (box 308 of FIG. 3) that may be used by the activity-based service provider 102 to create activities, share activities, coordinate activities, as well as provide meaningful information to remote users about activities from a plurality of data sources. The data sources may comprise or may be embodied on any device accessible to the activity-based service provider 102 over the network 108 and may include, for example, a client device 106, third party service provider 104, cellular network devices that may provide cell ID information, as well as other devices. These data sources may include, for example, geocodes that may associate location data such as may be received as a location indication with a meaningful physical or virtual location, messages (e.g. a short message service (SMS) message, multimedia messaging service (MMS) message, instant message (IM), e-mail, and/or the like), a mapping service provider, a calendar application, a social networking service, an information directory (e.g., a phonebook directory), search utilities, and/or the like. These data sources may be embodied on a client device 106 and/or as a third party service provider 104.

The activity-based service provider 102 may be further configured to receive advertising data (box 306 of FIG. 3), such as from an advertising server, which may be embodied as a third party service provider 104. This advertising data may comprise various advertising content that the activity-based service provider 102 may be configured to match with activities or other user data when providing information to remote users such that users may receive requested information along with related advertising content. In this regard, the activity-based service provider 102 may provide targeted, context aware advertising (box 316 of FIG. 3) based at least in part upon information context. These context aware advertisements may be provided to a client device 106, third party service provider 104, or other device.

The activity-based service provider 102 may be configured to provide a plurality of activity-based services for users of devices such as a client device 106 using the received data and activity information. For example, the activity-based service provider 102 may be configured to provide location recognition such that a meaningful location can be determined from received location indications and associated with an activity. Further, the activity-based service provider 102 may be configured to associate a location with a "place." In this regard, a "place" may comprise location data, such as, for example, a street address or latitude and longitude coordinates, with context. This context may include information about the place, such as, for example, a name of a resident or property owner if the associated location is a residence (e.g., "Bill's House") or a business name if it is a business (e.g., "Nokia Headquarters"). Additionally or alternatively, the context information may include activities occurring at and/or scheduled to occur at the place. The context information may further include users that are currently located at the place, scheduled to be located at the place in the future (e.g., for an activity), and/or were previously located at the place (e.g., for an activity). The context information may additionally include user comments about the place, photographs of or related to the place, and/or user ratings of the place. In an exemplary embodiment, a place may be globally defined such that any user accessing information about a location or place may be directed to the associated place as well as associated context information. In this regard, a place may comprise an associated name such that users may identify the place by its name. A place may originally be defined by a user and/or may be defined by the activity-based service provider 102, such as based at least in part upon received activity data and/or location indications. Accordingly, a place may provide context to facilitate social interaction with respect to activities between users of the system 100.

In this regard, the activity-based service provider 102 may be configured to use available location, place, and/or context information to provide place and/or location data (box 310 of FIG. 3) to users of the system 100, such as by sending place data to devices of the system 100. These devices may include, for example, a client device 106, third party service provider 104, as well as other devices, where the place data may be viewed or otherwise accessed by a user. The place data may comprise a place name, address, longitude/latitude coordinates of the place, activities occurring at the place, user comments about the place, photographs of the place, and/or user ratings (e.g., popularity ratings) of the place.

The activity-based service provider 102 may additionally be configured to provide privacy management. In this regard, users may manage privacy settings with respect to how much information is shared with other users. Such information may comprise created activities, user profile information, activities in which the user is participating, historical activity data, places associated with the user, and/or the like. The activity-based service provider 102 may be configured to provide privacy management capabilities such that a user may define different privacy levels for different types of information and/or different groups of contacts (e.g., business contacts, personal contacts, unknown contacts, etc).

The activity-based service provider 102 may further be configured to provide data harmonization. Such data harmonization may include globally updating activity and place information across the system 100. Additionally or alternatively, data harmonization may comprise importing data from and/or exporting data to client devices 106 and/or third party service providers 104 such that data may be harmonized so as to be consistent across a plurality of services and/or applications that may be accessed from or reside on a plurality of devices of the system 100.

Additionally, the activity-based service provider 102 may be configured to aggregate historical data, such as data describing a user's history of activity participation, locations at which the user has been located, and/or the like. This historical data may be provided to the user and/or to contacts with permission to view the user's history, such as in the form of a social timeline (box 312 of FIG. 3). Also, this historical data as well as any associated user profile information, such as personal preferences, may be used by the activity-based service provider 102 to personalize activity-based services provided to the user. This personalization may include personalized suggestions (box 314 of FIG. 3) of relevant places, activities, and/or contacts in which the user may be interested. In an exemplary embodiment, the activity-based service provider may be further configured to provide a search service to users. In this regard, users of remote computing devices, such as a client device 106, may be able to search data stored or accessible by the activity-based service provider 102 for information regarding activities, places, and contacts.

Referring again to FIG. 1, the activity-based service provider 102 may include various means, such as a processor 110, memory 112, communication interface 114, user interface 116, and activity coordination unit 118 for performing the various functions herein described. These means of the activity-based service provider 102 as described herein may be embodied as, for example, hardware elements (e.g., a suitably programmed processor, combinational logic circuit, and/or the like), computer code (e.g., software or firmware) embodied on a computer-readable medium (e.g. memory 112) that is executable by a suitably configured processing device (e.g., the processor 110), or some combination thereof. The processor 110 may, for example, be embodied as various means including a microprocessor, a coprocessor, a controller, or various other processing elements including integrated circuits such as, for example, an ASIC (application specific integrated circuit) or FPGA (field programmable gate array). In an exemplary embodiment, the processor 110 may be configured to execute instructions stored in the memory 112 or otherwise accessible to the processor 110. Although illustrated in FIG. 1 as a single processor, the processor 110 may comprise a plurality of processors operating in parallel, such as a multi-processor system. Such multiple processors may be embodied in a single computing device or may be distributed across multiple computing devices, such as in a server cluster.

The memory 112 may include, for example, volatile and/or non-volatile memory. The memory 112 may be configured to store information, data, applications, instructions, or the like for enabling the activity-based service provider 102 to carry out various functions in accordance with exemplary embodiments of the present invention. For example, the memory 112 may be configured to buffer input data for processing by the processor 110. Additionally or alternatively, the memory 112 may be configured to store instructions for execution by the processor 110. The memory 112 may comprise one or more databases that store information in the form of static and/or dynamic information. In this regard, the memory 112 may store, for example, activities and associated information, places and associated information, user profiles, contacts, information atoms, and/or the like, such as may be used in an activity-based service. This stored information may be stored and/or used by the activity coordination unit 118 during the course of performing its functionalities.

The communication interface 114 may be embodied as any device or means embodied in hardware, software, firmware, or a combination thereof that is configured to receive and/or transmit data from/to a network, such as the network 108, and/or any other device, such as a third party service provider 104 and/or client device 106, in communication with the activity-based service provider 102. In one embodiment, the communication interface 114 may be at least partially embodied as or otherwise controlled by the processor 110. The communication interface 114 may include, for example, an antenna, a transmitter, a receiver, a transceiver and/or supporting hardware or software for enabling communications with other entities of the system 100, such as a third party service provider 104 and/or client device 106 via the network 108. The communication interface 114 may be configured to receive and/or transmit data using any protocol that may be used for communications between the activity-based service provider 102 and other computing devices of the system 100, such as a third party service provider 104 and/or a client device 106, over the network 108. The communication interface 114 may additionally be in communication with the memory 112, user interface 116, and/or activity coordination unit 118, such as via a bus.

The user interface 116 may be in communication with the processor 110 to receive an indication of a user input and/or to provide an audible, visual, mechanical, or other output to the user. As such, the user interface 116 may include, for example, a keyboard, a mouse, a joystick, a display, a touch screen display, a microphone, a speaker, and/or other input/output mechanisms. However, in an exemplary embodiment wherein the activity-based service provider 102 is embodied as a server, elements of the user interface may be reduced or even eliminated. The user interface 116 may further be in communication with the memory 112, communication interface 116, and/or activity coordination unit 118, such as via a bus.

The activity coordination unit 118 may be embodied as various means, such as hardware, software, firmware, or some combination thereof and, in one embodiment, may be embodied as or otherwise controlled by the processor 110. In embodiments where the activity coordination unit 118 is embodied separately from the processor 110, the activity coordination unit 118 may be in communication with the processor 110. The activity coordination unit 118 may be configured to receive, process, and send data and information related to the provision of activity-based services as discussed above in conjunction with FIG. 3. In this regard, the activity coordination unit 118 may be configured to manage and store, such as in memory 112, activity coordination information. This activity coordination information may include, for example, activities, contacts and/or places, which may be stored as information atoms, that a user of a client device 106 may utilize to schedule and/or coordinate activities. Accordingly, the activity coordination unit 118 may be configured to facilitate creation, access, and/or modification of activities, contacts, and/or places by users of an activity-based service.

In an exemplary embodiment, the activity coordination unit 118 may be configured to receive a request for a context-sensitive calendar. This request may be received, for example, from a client device 106 or a third party service provider 104. For example, a user of a client device 106 may browse or otherwise utilize services provided by the activity-based service provider 102 and in the course of usage of such services may explicitly and/or implicitly request a context-sensitive calendar. In this regard, a user of a client device 106 may access activity-based services and interact with the activity-based service provider via a viewing agent embodied on the client device 106. The viewing agent may be embodied, for example, as a web browser configured to receive data from and transmit data to the activity coordination unit 118. This data may comprise, for example, a web page, activity coordination information, information atoms, context-sensitive calendars, activities, places, contacts, query criteria, search results, filtering parameters, and/or the like. In an alternative embodiment, the viewing agent may be embodied as a dedicated application (e.g., a standalone application, applet executed by a web browser, and/or the like) configured to provide a user interface for an activity-based service. In embodiments where the viewing agent is embodied as a dedicated application, the viewing agent may be embodied as any means, including, for example, hardware, software, firmware, or some combination thereof. Such a dedicated application may be embodied and executed on the client device 106. Alternatively, such a dedicated application may be embodied as a web application accessible by the client device 106. The web application may, for example, be embodied as a series of program instructions stored on the memory 112 and executed by the processor 110. In some embodiments, the viewing agent may be embodied as the activity coordination unit 118.

The activity coordination unit 118 may receive a request for a context-sensitive calendar, for example, in response to a user accessing a web page comprising information about a contact, place, and/or activity. In this regard, the activity coordination unit 118 may be configured to dynamically generate a context-sensitive calendar comprising information sensitive to the context of the accessed web page. Additionally or alternatively, the request may comprise a subscription request. In this regard, a user, application, and/or service (e.g., third party service provider 104) may subscribe to a context-sensitive calendar comprising subscription-defined contextual information, such that the activity coordination unit 118 may be configured to periodically, such as in accordance with the subscription terms, generate a context-sensitive calendar in accordance with the subscription context and provide the context-sensitive calendar to the subscriber.

The received context-sensitive calendar request may comprise an indication of an associated context. In this regard, the indication may comprise an indication of the associated context in which the request was made, e.g., in what context the user was interacting with an activity-based service. For example, the context may be place information, contact information, activity information, and/or the like. In this regard, for example, a user may request or otherwise access information about a place, in which case, the context may be regarded as "place information." Additionally or alternatively, a user may request or otherwise access information about a contact, in which case, the context may be regarded as "contact information." A user may further request or otherwise access information about an activity and/or create a new activity, in which case, the context may be regarded as "activity information." The activity coordination unit 118 may accordingly be configured to determine the context associated with the received request based at least in part upon the indication received with the request. The activity coordination unit 118 may further be configured to aggregate one or more information atoms based at least in part upon the determined context. These information atoms may comprise contacts, places, and/or activities as well as information associated therewith, which may be stored in a memory, such as the memory 112.

The activity coordination unit 118 may determine the context associated with the received request to be place information, wherein, for example, a user may request a context-sensitive calendar comprising information about one or more places. The activity coordination unit 118 may accordingly be configured to aggregate one or more activities occurring at the place(s) about which information is requested within a predefined time window. In this regard, a "time window" as used herein may refer to any single point in time as well as to a window between any two points in time. In this regard, the window of a time window is not limited to any finite duration.

The time window may not even have defined bounds. The time window may comprise a past period of time, a current time, a future period of time, or some combination thereof. A time window may be predefined by the activity coordination unit 118 (e.g., a system default in the absence of a user customized time window), by a user of a client device 106, by a third party service provider 104, and/or the like. In some embodiments, the time window may be predefined by the request itself, in that the time window may be defined and received in the request for the context-sensitive calendar. Accordingly, the activity coordination unit 118 may be configured to search for information atoms such as may be stored in memory 112 defining activities occurring at the place within the predefined window and aggregate those satisfying the search criteria. Additionally or alternatively, the activity coordination unit 118 may be configured to determine and aggregate one or more contacts scheduled to be located at the place within a predefined time window. In this regard, contacts may schedule participation in activities having an associated time and/or location. Accordingly, the activity coordination unit 118 may be configured to determine contacts scheduled to participate in activities scheduled to occur at the place and/or contacts otherwise scheduled to be located at the place within the predefined time window. Further, contacts may be known by the activity-based service provider 102 to reside in a city, state, country, and/or the like in which the place is located. Accordingly, the activity coordination unit 118 may be configured to determine and aggregate such contacts.

The activity coordination unit 118 may further be configured to determine and aggregate contacts scheduled to be located in a town, city, municipality, county, state, region, country, and/or the like in which the place is located within the predefined time window. In some embodiments, the activity coordination 118 may be configured to determine and aggregate and/or otherwise specially flag contacts traveling to (e.g., contacts who do not live in proximity to the place, but may be traveling to a location in proximity to the place, such as for business or personal reasons) a town, city, municipality, county, state, region, country, and/or the like in which the place is located within the predefined time window.

The activity coordination unit 118 may determine the context to be contact information, wherein a user may, for example, have requested a context-sensitive calendar comprising information about one or more contacts (e.g., a group or category of contacts). In such an instance, the activity coordination unit 118 may be configured to determine and aggregate one or more activities in which the contact(s) is scheduled to participate within a predefined time window. In this regard each contact or user of an activity-based service may be scheduled to participate in a plurality of activities, each of which may have an associated time or time window defining when the activity is scheduled to occur. Accordingly, the activity coordination unit 118 may be configured to determine and aggregate activities in which the contact(s) is scheduled to participate in the predefined time window. The activity coordination unit 118 may also be configured to determine and aggregate one or more places and/or locations at which the contact(s) is scheduled to be located within the predefined time window.

The activity coordination unit 118 may determine the context to be activity information, wherein a user may, for example, have requested a context-sensitive calendar comprising information that may assist the user with activity coordination and/or planning. In this regard, the context-sensitive calendar request may comprise receiving a request for creation of a new activity and/or access of an existing activity which the user has permission to modify and/or invite additional contacts to participate in. In such an instance, the activity coordination unit 118 may be configured to determine and aggregate one or more contacts scheduled to be located in proximity to a location associated with the activity within a predefined time window of a time associated with the activity. In this regard, the activity coordination unit 118 may be configured to determine contacts scheduled to be located at a place at which the activity is scheduled to occur, within a predefined distance of a location at which the activity is scheduled to occur, and/or a town, city, municipality, county, state, region, country, and/or the like in which the activity is scheduled to occur. In some embodiments, the activity coordination 118 may be configured to determine and aggregate and/or otherwise specially flag contacts traveling to (e.g., contacts who do not live in proximity to a location or place at which the activity is scheduled to occur, but may be traveling to a location in proximity to the location or place where the activity is scheduled to occur, such as for business or personal reasons) a town, city, municipality, county, state, region, country, and/or the like in which the activity is scheduled to occur within the predefined time window. Further, contacts may be known by the activity-based service provider 102 to reside in a city, state, country, and/or the like in which the activity is scheduled to occur. Accordingly, the activity coordination unit 118 may be configured to determine and aggregate such contacts.

The activity coordination unit 118 may further be configured to determine and aggregate one or more contacts that will be traveling to a hometown of a user within a predefined time period. In this regard, the activity coordination unit 118 may generate context-sensitive calendars comprising contact information that may facilitate user planning of activities, such as scheduling activities with old out of town friends or business contacts who may be visiting the user's hometown.

Figure 4:
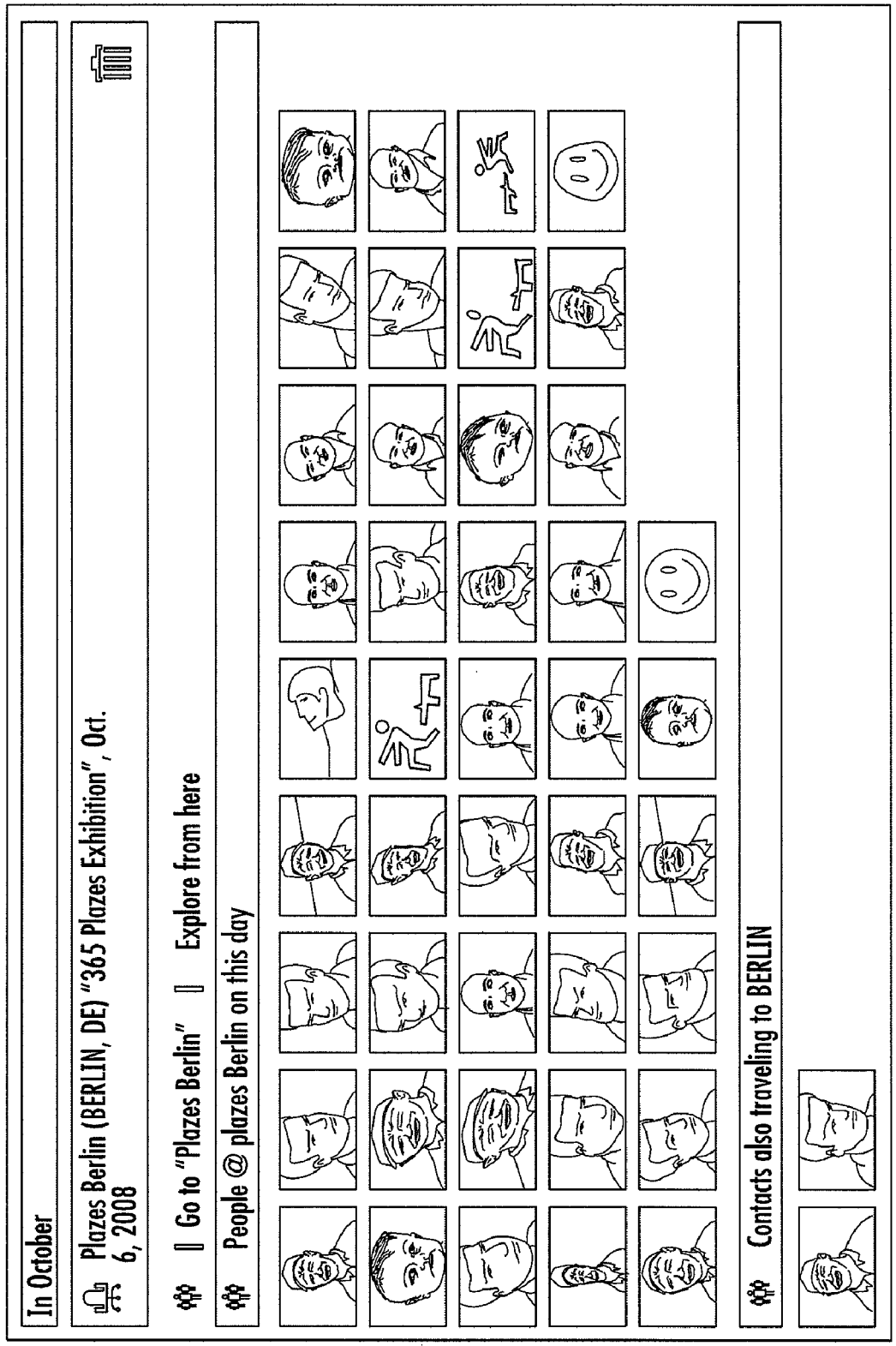
FIG. 4 illustrates a screenshot of a context-sensitive calendar according to an exemplary embodiment of the present invention.

The activity coordination unit 118 may additionally be configured to generate a context-sensitive calendar comprising the determined and aggregated information atoms. The activity coordination unit 118 may then provide the generated context-sensitive calendar to a user. In this regard, the activity coordination unit 118 may be configured to send the generated context-sensitive calendar to a computing device associated with a user, such as, for example, a third party service provider 104 or a client device 106. The activity coordination unit 118 may be configured to transmit the context-sensitive calendar as data using any common transmission protocol via the communication interface 114. Additionally or alternatively, the activity coordination unit 118 may be configured to send the context-sensitive calendar as an attachment to an electronic message, such as, for example, an e-mail, text message, instant message, and/or the like. Providing a context-sensitive calendar to a user may further comprise sending and/or exporting the context-sensitive calendar to an application, such as, for example, a calendar application (e.g. Microsoft® Outlook™, Eudora®, Apple® iCal™, and/or the like), in which the context-sensitive calendar may be viewed. Additionally or alternatively, providing the generated context-sensitive calendar to a user may comprise causing the context-sensitive calendar to be displayed in a viewing agent on a display device, such as, for example, a client device 106. As used herein, causing a context-sensitive calendar to be displayed refers to embodiments in which the activity coordination unit 118 actively instructs the viewing agent to display the context-sensitive calendar as well as to embodiments in which the activity coordination unit 118 sends data comprising the context-sensitive calendar to a device, such as a client device 106, such that a viewing agent may render the context-sensitive calendar based at least in part upon the sent data. Accordingly, context-sensitive calendars which the activity coordination unit 118 causes to be displayed may be displayed in a viewing agent on a display device, such as a monitor, display screen, and/or the like, which may, for example, be embodied on or operatively coupled to the client device 106. FIG. 4 illustrates a screenshot of a context-sensitive calendar, which the activity coordination unit 118 may generate and provide to a user. As may be seen, the context-sensitive calendar of FIG. 4 has a context associated with a place ("Plazes Berlin") and comprises contacts at the place during a predefined time window ("this day") as well as contacts traveling to a city in which the place is located ("Berlin") during the predefined time window.

Figures 5A, 5B, 5C, 5D:
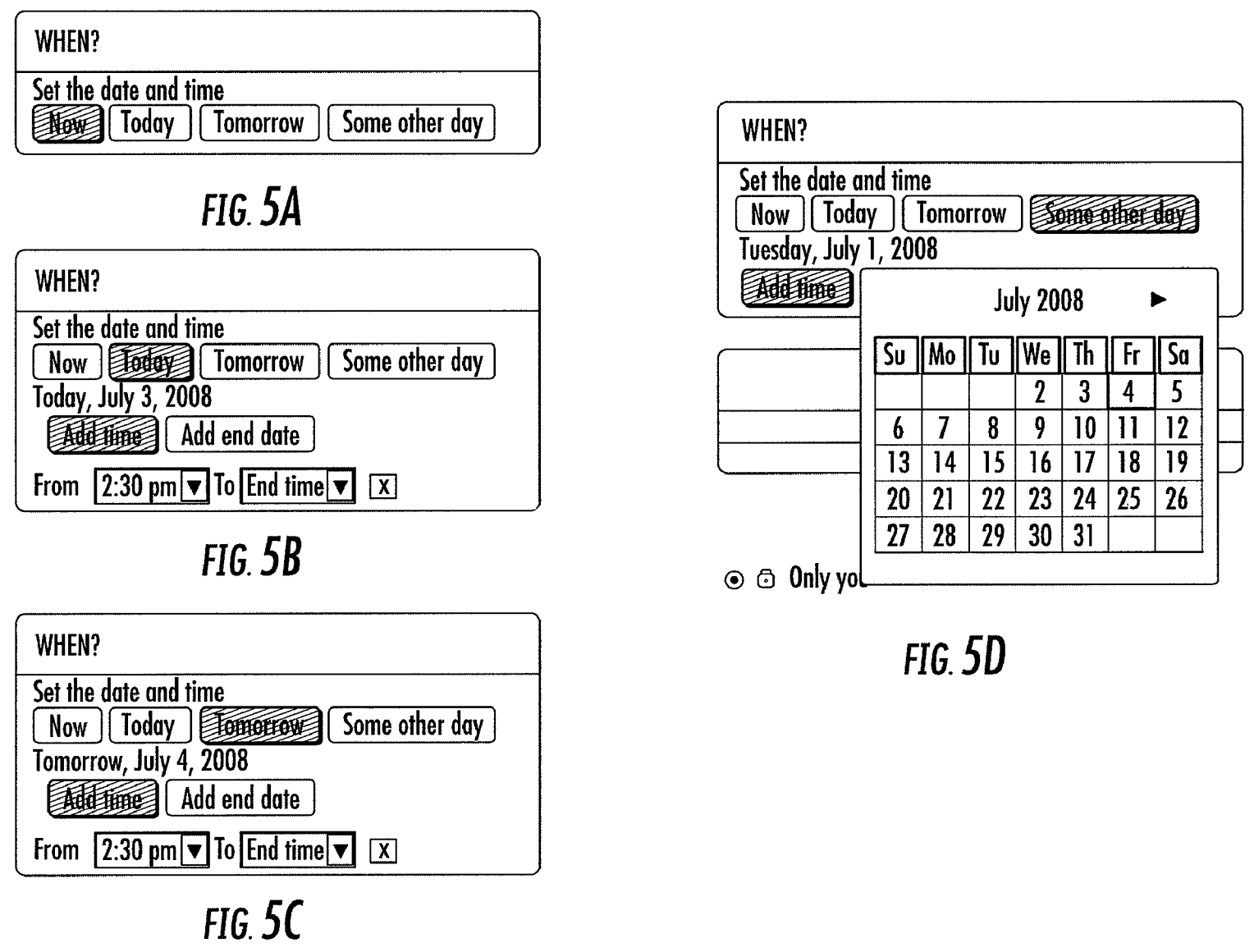

In an exemplary embodiment, the activity coordination unit 118 may additionally be configured to simplify the selection of a time window for an activity when a user of a client device 106 creates a new activity and/or modifies time information associated with an existing activity. In this regard, each activity may have an associated time window defining when the activity will occur. The activity coordination unit 118 may be configured to simplify defining this time window by causing a cascading date range selector to be displayed in a viewing agent on the client device 106. In an exemplary embodiment, the cascading date range selector may initially be displayed to a user in its dormant form (e.g. before any user interaction) as an interface providing the user with four options for specifying a time window. The first option is "now" (FIG. 5*a*), selection of which may result in the activity coordination unit 118 prefilling the time window as being this moment in time. The second option is "today" (FIG. 5*b*), selection of which may cause the activity coordination unit 118 to cause a time selector to be displayed so that the user may define a time window within the current day. The third option is "tomorrow" (FIG. 5*c*), selection of which may cause the activity coordination unit 118 to prefill the date with tomorrow's date and then cause a time selector to be displayed so that the user may define a time window within the next day. The fourth option is "other time" (FIG. 5*d*), selection of which may result in the activity coordination unit 118 causing a calendar and/or other means of date selection to be displayed such that the user may specify a time window for the activity. This cascading date range selector may cascade in granularity by allowing the user to pre-fill values for at time window for an activity through the use of shortcut buttons in the cascading date range selector. In this regard, the activity coordination unit 118 may only cause date selector tools (e.g. interactive calendar) to be displayed when the user indicates a wish to provide this information and not before.

Figure 6:
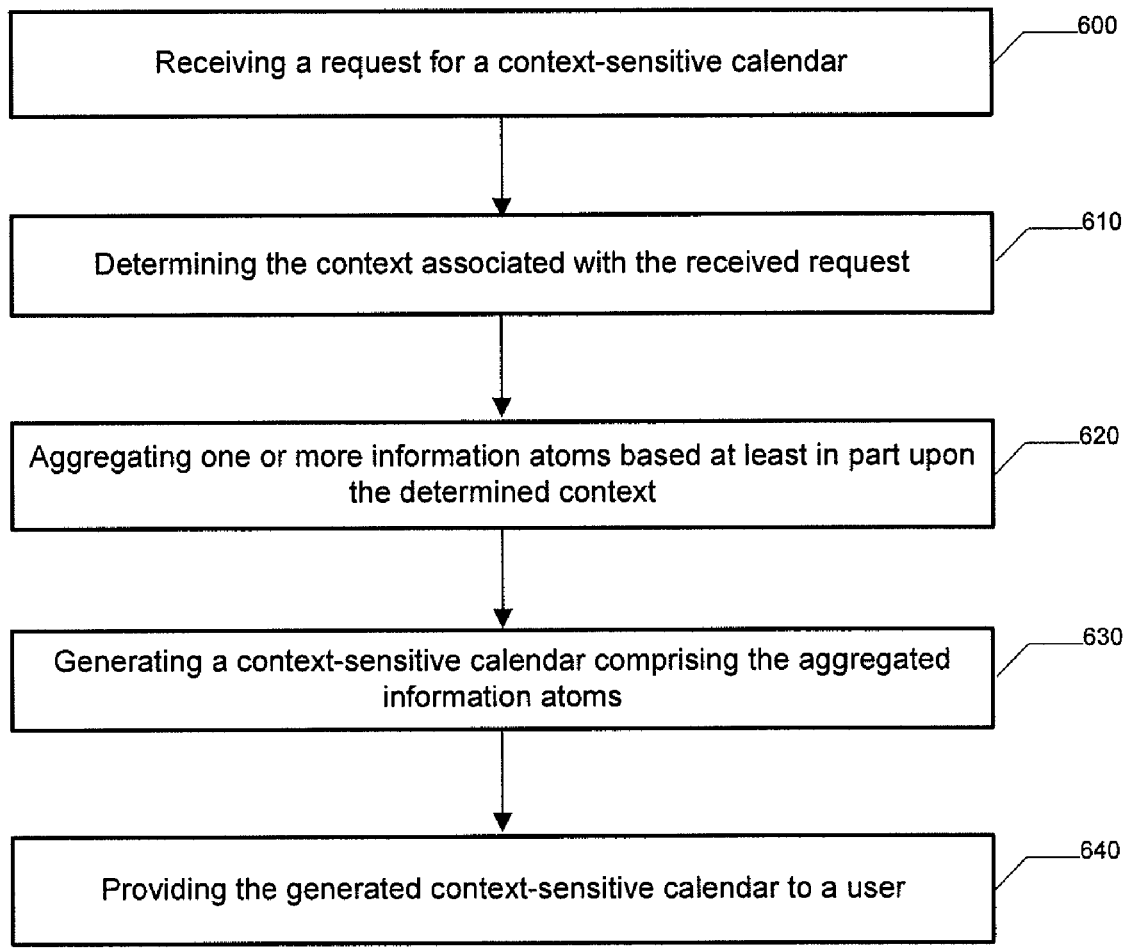
FIG. 6 is a flowchart according to an exemplary method for providing context-sensitive calendars according to an exemplary embodiment of the present invention.

FIG. 6 is a flowchart of a system, method, and computer program product according to an exemplary embodiment of the invention. It will be understood that each block or step of the flowchart, and combinations of blocks in the flowchart, may be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal, server, or other computing device and executed by a processor in the computing device. In some embodiments, the computer program instructions which embody the procedures described above may be stored by memory devices of a plurality of computing devices. As will be appreciated, any such computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, may be implemented by special purpose hardware-based computer systems which perform the specified functions or steps, or combinations of special purpose hardware and computer instructions.

In this regard, one exemplary method for providing context-sensitive calendars according to an exemplary embodiment of the present invention is illustrated in FIG. 6. The method may include the activity coordination unit 118 receiving a request for a context-sensitive calendar, at operation 600. The request may comprise an indication of a context associated with the request. Operation 610 may comprise the activity coordination unit 118 determining the context associated with the received request. The activity coordination unit 118 may then aggregate one or more information atoms based at least in part upon the determined context, at operation 620. Operation 630 may comprise the activity coordination unit 118 generating a context-sensitive calendar comprising the aggregated information atoms. The activity coordination unit 118 may then provide the generated context-sensitive calendar to a user, at operation 640.

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention may provide several advantages to a user of a computing device, such as a mobile terminal 10. Embodiments of the invention may provide for the generation of and access to context-sensitive calendars. In this regard, context-sensitive calendars may provide for calendars that are dynamically built based at least in part upon a context in which a user is using an activity-based service. Users may subscribe to particular context-sensitive calendars such that the user may periodically receive updated context-sensitive calendars comprising information based upon the user's subscription preferences. Such context-sensitive calendars may provide a much richer solution in comparison to standard events calendars, which merely add events onto a local calendar and may only provide one discrete dimension of information, e.g., what is happening and when. In contrast to standard events calendars, context-sensitive calendars may be dynamically generated so as to provide multi-dimensional views of user activity data so as to facilitate coordination and planning of activities.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
receiving a request for a context-sensitive calendar, the request comprising a request for creation of a new activity and further comprising an indication of an associated context, the indication of the associated context comprising an indication of a location associated with the new activity, wherein the request is associated with a user;
determining the context associated with the received request to comprise activity information based at least in part on the indication of the location;
aggregating one or more information atoms based at least in part upon the determined context, the aggregated information atoms being selected based at least in part upon the determined context from information atoms compiled from data received from a community of users, the aggregated information atoms comprising one or more contacts of the user scheduled to be located in a predefined proximity to the location associated with the new activity within a predefined time window of a time associated with the new activity;
generating, by a processor, a context-sensitive calendar comprising the aggregated information atoms; and
causing the generated context-sensitive calendar to be provided to the user.

2. The method according to claim 1, wherein the aggregated information atoms further comprise one or more activities scheduled to occur at the location within a predefined time window.

3. The method according to claim 2, wherein the one or more activities scheduled to occur at the location comprise at least one activity created by a second user, wherein the user is not scheduled to participate in the activity created by the second user at the time of the request.

4. The method according to claim 1, wherein the one or more contacts of the user comprise one or more contacts of the user scheduled to be located in a town, city, municipality, county, state, region, or country associated with the location associated with the new activity within the predefined time window.

5. The method according to claim 1, wherein:
the indication of the associated context further comprises an indication of a contact; and
determining the context associated with the received request comprises determining the context to further comprise contact information.

6. The method according to claim 5, wherein aggregating one or more information atoms comprises aggregating one or more activities in which the indicated contact is scheduled to participate within a predefined time window.

7. The method according to claim 5, wherein aggregating one or more information atoms comprises aggregating one or more places at which the indicated contact is scheduled to be located within a predefined time window.

8. The method according to claim 1, wherein the one or more information atoms comprise information about one or more of a contact, a place, or an activity.

9. The method according to claim 1, wherein causing the generated context-sensitive calendar to be provided to the user comprises causing the context-sensitive calendar to be displayed in a viewing agent on a display device.

10. The method according to claim 1, wherein aggregating one or more information atoms comprises aggregating one or more information atoms stored in a memory.

11. The method according to claim 1, further comprising:
causing a cascading date range selector to be provided to enable the user to select one or more of a date or time for the new activity.

12. The method according to claim 11, wherein the cascading date range selector comprises an option, which when selected, causes a time for the new activity to be selected as a current time.

13. The method according to claim 11, wherein the cascading date range selector comprises an option, which when selected causes a date for the new activity to be selected as a current date and enables the user to define a time window for the new activity on the present date.

14. The method according to claim 11, wherein the cascading date range selector comprises an option, which when selected causes a date for the new activity to be selected as the day after a current date and enables the user to define a time window for the new activity on the day after the current date.

15. The method according to claim 11, wherein the cascading date range selector comprises an option, which when selected, enables the user to select a date and time window for the activity.

16. A computer program product comprising at least one non-transitory computer-readable storage medium having computer-readable program instructions stored therein, the computer-readable program instructions comprising:
program instructions configured to receive a request for a context-sensitive calendar, the request comprising a request for creation of a new activity and further comprising an indication of an associated context, the indication comprising an indication of a location associated with the new activity, wherein the request is associated with a user;
program instructions configured to determine the context associated with the received request to comprise activity information based at least in part on the indication of the location;
program instructions configured to aggregate one or more information atoms based at least in part upon the determined context, the aggregated information atoms being selected based at least in part upon the determined context from information atoms compiled from data received from a community of users, the aggregated information atoms comprising one or more contacts of the user scheduled to be located in a predefined proximity to the location associated with the new activity within a predefined time window of a time associated with the new activity;

program instructions configured to generate a context-sensitive calendar comprising the aggregated information atoms; and program instructions configured to cause the generated context-sensitive calendar to be provided to the user.

17. The computer program product according to claim 16, wherein the aggregated information atoms further comprise one or more activities scheduled to occur at the location within a predefined time window.

18. The computer program product according to claim 16, wherein the one or more contacts of the user comprise one or more contacts of the user scheduled to be located in a town, city, municipality, county, state, region, or country associated with the location associated with the new activity within the predefined time window.

19. The computer program product according to claim 16, wherein:
the indication of the associated context further comprises an indication of a contact; and
the program instructions configured to determine the context comprise program instructions configured to determine the context to further comprise contact information.

20. The computer program product according to claim 19, wherein the program instructions configured to aggregate one or more information atoms comprise program instructions configured to aggregate one or more activities in which the indicated contact is scheduled to participate within a predefined time window.

21. The computer program product according to claim 19, wherein the program instructions configured to aggregate one or more information atoms comprise program instructions configured to aggregate one or more places at which the indicated contact is scheduled to be located within a predefined time window.

22. The computer program product according to claim 16, wherein the program instructions configured to cause the context-sensitive calendar to be provided to the user comprise program instructions configured to cause the context-sensitive calendar to be displayed in a viewing agent on a display device.

23. An apparatus comprising at least one processor and at least one memory storing computer program code, wherein the at least one memory and stored computer program code are configured, with the at least one processor, to cause the apparatus to at least:
receive a request for a context-sensitive calendar, the request comprising a request for creation of a new activity and further comprising an indication of an associated context, the indication of the associated context comprising an indication of a location associated with the new activity, wherein the request is associated with a user;
determine the context associated with the received request to comprise activity information based at least in part on the indication of the location;
aggregate one or more information atoms based at least in part upon the determined context, the aggregated information atoms being selected based at least in part upon the determined context from information atoms compiled from data received from a community of users, the aggregated information atoms comprising one or more contacts of the user scheduled to be located in a predefined proximity to the location associated with the new activity within a predefined time window of a time associated with the new activity;
generate a context-sensitive calendar comprising the aggregated information atoms; and
cause the generated context-sensitive calendar to be provided to the user.

24. The apparatus according to claim 23, wherein the aggregated information atoms further comprise one or more activities scheduled to occur at the location within a predefined time window.

25. The apparatus according to claim 23, wherein the one or more contacts of the user comprise one or more contacts of the user scheduled to be located in a town, city, municipality, county, state, region, or country associated with the location associated with the new activity within the predefined time window.

26. The apparatus according to claim 23, wherein the indication of the associated context further comprises an indication of a contact; and
wherein the at least one memory and stored computer program code are configured, with the at least one processor, to cause the apparatus to determine the context associated with the received request to further comprise contact information.

27. The apparatus according to claim 26, wherein the at least one memory and stored computer program code are configured, with the at least one processor, to cause the apparatus to aggregate one or more information atoms at least in part by aggregating one or more activities in which the indicated contact is scheduled to participate within a predefined time window.

28. The apparatus according to claim 26, wherein the at least one memory and stored computer program code are configured, with the at least one processor, to cause the apparatus to aggregate one or more information atoms at least in part by aggregating one or more places at which the indicated contact is scheduled to be located within a predefined time window.

29. The apparatus according to claim 23, wherein the one or more information atoms comprise information about one or more of a contact, a place, or an activity.

30. The apparatus according to claim 27, wherein the at least one memory and stored computer program code are configured, with the at least one processor, to cause the apparatus to cause the generated context-sensitive calendar to be provided to the user by causing the context-sensitive calendar to be displayed in a viewing agent on a display device.

* * * * *

UNITED STATES PATENT AND TRADEMARK OFFICE
CERTIFICATE OF CORRECTION

PATENT NO.       : 8,291,018 B2
APPLICATION NO.  : 12/241596
DATED            : October 16, 2012
INVENTOR(S)      : Petersen et al.

Page 1 of 1

It is certified that error appears in the above-identified patent and that said Letters Patent is hereby corrected as shown below:

In the Claims:

<u>Column 20,</u>
Line 54, "claim 27" should read --claim 23--.

Signed and Sealed this
Seventh Day of May, 2013

Teresa Stanek Rea
*Acting Director of the United States Patent and Trademark Office*